(12) United States Patent
Yamana et al.

(10) Patent No.: US 7,845,161 B2
(45) Date of Patent: Dec. 7, 2010

(54) INTERNAL COMBUSTION ENGINE AND CONTROL METHOD FOR INTERNAL COMBUSTION ENGINE

(75) Inventors: Shunsuke Yamana, Tokyo (JP); Sunki I, Hwa-sung (KR); Kenichi Sato, Yokohama (JP); Kimiyoshi Nishizawa, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 700 days.

(21) Appl. No.: 11/752,990

(22) Filed: May 24, 2007

(65) Prior Publication Data

US 2007/0271907 A1 Nov. 29, 2007

(30) Foreign Application Priority Data

May 29, 2006 (JP) ............................. 2006-147801
May 30, 2006 (JP) ............................. 2006-149145

(51) Int. Cl.
*F01N 3/00* (2006.01)
(52) U.S. Cl. .................... 60/285; 60/278; 60/287; 60/288; 60/292; 60/324
(58) Field of Classification Search ................ 60/274, 60/278, 285, 286, 287, 288, 290, 291, 292, 60/324
See application file for complete search history.

(56) References Cited

U.S. PATENT DOCUMENTS

| | | | | |
|---|---|---|---|---|
| 5,233,831 A | * | 8/1993 | Hitomi et al. | 60/284 |
| 5,293,741 A | * | 3/1994 | Kashiyama et al. | 60/284 |
| 5,386,694 A | * | 2/1995 | Ogawa et al. | 60/276 |
| 6,192,675 B1 | * | 2/2001 | Hirota et al. | 60/286 |
| 6,253,547 B1 | * | 7/2001 | Watanabe et al. | 60/297 |
| 6,397,586 B1 | * | 6/2002 | Sakurai et al. | 60/288 |
| 6,681,567 B2 | * | 1/2004 | Yasui et al. | 60/297 |
| 2005/0268600 A1 | | 12/2005 | I et al. | |
| 2006/0174607 A1 | | 8/2006 | Mori et al. | |
| 2006/0225408 A1 | | 10/2006 | Inoue et al. | |
| 2006/0236682 A1 | | 10/2006 | I et al. | |

FOREIGN PATENT DOCUMENTS

| | | |
|---|---|---|
| DE | 10052953 A1 | 7/2001 |
| EP | 0640381 A1 | 3/1995 |
| EP | 1605145 | 12/2005 |
| EP | 1695757 | 8/2006 |
| EP | 1710408 | 10/2006 |
| EP | 1715152 | 10/2006 |
| JP | 05-321644 | 12/1993 |

* cited by examiner

*Primary Examiner*—Binh Q Tran
(74) *Attorney, Agent, or Firm*—Global IP Counselors, LLP

(57) ABSTRACT

An internal combustion engine includes a main catalyst disposed in a main passage and a bypass catalyst disposed in a bypass passage bypassing the main passage on an upstream side of the main catalyst. The bypass passage has a smaller transverse cross-sectional area than the main passage. The internal combustion engine further includes a passage open/close unit, a residual gas amount changing unit, and a controller. The passage open/close unit is disposed in a portion of the main passage bypassed by the bypass passage to switch between an open state and a closed state. The residual gas amount changing unit is configured to change an amount of residual gas inside a combustion chamber. The controller is configured to control the residual gas amount changing unit when a passage opening condition for switching the passage open/close unit from the closed state to the open state is satisfied.

17 Claims, 5 Drawing Sheets

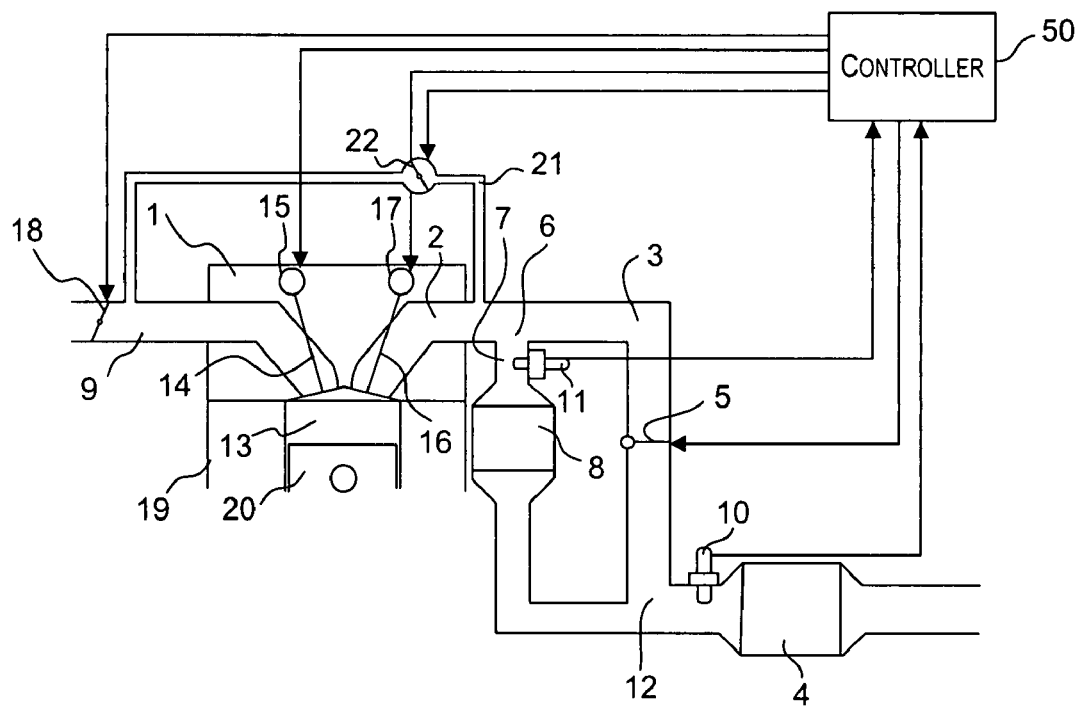
F I G. 1

INTERNAL COMBUSTION ENGINE AND CONTROL METHOD FOR INTERNAL COMBUSTION ENGINE

CROSS-REFERENCE TO RELATED APPLICATIONS

This application claims priority to Japanese Patent Application No. 2006-147801, filed on May 29, 2006 and Japanese Patent Application No. 2006-149145, filed on May 30, 2006. The entire disclosures of Japanese Patent Application Nos. 2006-147801 and 2006-149145 are hereby incorporated herein by reference.

BACKGROUND OF THE INVENTION

1. Field of the Invention

The present invention relates to an internal combustion engine having an exhaust device and a method for controlling the internal combustion engine.

2. Background Information

In some conventional internal combustion engines having an exhaust device, a main catalytic converter is arranged on a relatively downstream side in an exhaust system underneath a floor panel or the like of a vehicle. Thus, a thorough exhaust purification effect cannot be expected before the catalytic converter is activated after the temperature of the catalytic converter starts rising upon cold starting of the internal combustion engine. However, if the catalytic converter is arranged in a position closer to the internal combustion engine on a relatively upstream side in the exhaust system, a reduced endurance of the catalytic converter becomes a problem due to thermal aging of a catalyst.

Therefore, Japanese Laid-Open Patent Application Publication No. 5-321644 discloses a conventional exhaust device for an internal combustion engine in which a main catalytic converter is disposed in a main exhaust passage, and an additional bypass catalytic converter is disposed in a bypass passage that is provided in parallel with an upstream portion of the main passage with respect to the main catalytic converter. This conventional exhaust device is configured to selectively guide exhaust gas to the side of the bypass passage immediately after the cold starting by controlling a switching valve that is configured to switch between the main passage and the bypass passage. In this conventional exhaust device, the bypass catalytic converter is disposed in a position relatively closer to the upstream side (i.e., closer to the internal combustion engine) in the exhaust system than the main catalytic converter. Therefore, exhaust gas purification can be started from an earlier stage by the bypass catalytic converter, since the bypass catalytic converter is activated relatively early as compared to the main catalytic converter.

SUMMARY OF THE INVENTION

One object of the present invention is to provide an internal combustion engine and a control method of an internal combustion engine in which a sudden change in torque level is prevented from occurring by controlling a change in an amount of residual gas in cylinders of the engine upon opening of a passage switch valve.

In order to achieve the above mentioned object, an internal combustion engine includes an intake valve, an exhaust valve, a main passage, a main catalyst, a bypass passage, a bypass catalyst, a passage open/close unit, a residual gas amount and a controller. The intake valve is configured and arranged to selectively open to introduce fresh air into a combustion chamber. The exhaust valve is configured and arranged to selectively open to release exhaust gas from the combustion chamber. The main passage is fluidly coupled to the combustion chamber to discharge the exhaust gas from the combustion chamber. The main catalyst is disposed in the main passage. The bypass passage bypasses the main passage on an upstream side of the main catalyst. The bypass passage has a transverse cross-sectional area that is smaller than a transverse cross-sectional area of the main passage. The bypass catalyst is disposed in the bypass passage. The passage open/close unit is disposed in a portion of the main passage bypassed by the bypass passage and configured and arranged to switch between an open state and a closed state to selectively open or selectively close the main passage. The residual gas amount changing unit is configured and arranged to change an amount of residual gas remaining inside the combustion chamber. The controller is configured to control the residual gas amount changing unit when a passage opening condition for switching the passage open/close unit from the closed state to the open state is satisfied.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure:

FIG. 1 is a simplified schematic diagram of an internal combustion engine illustrating an overall passage arrangement of an exhaust device of the internal combustion engine in accordance with the first embodiment of the present invention;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 2:
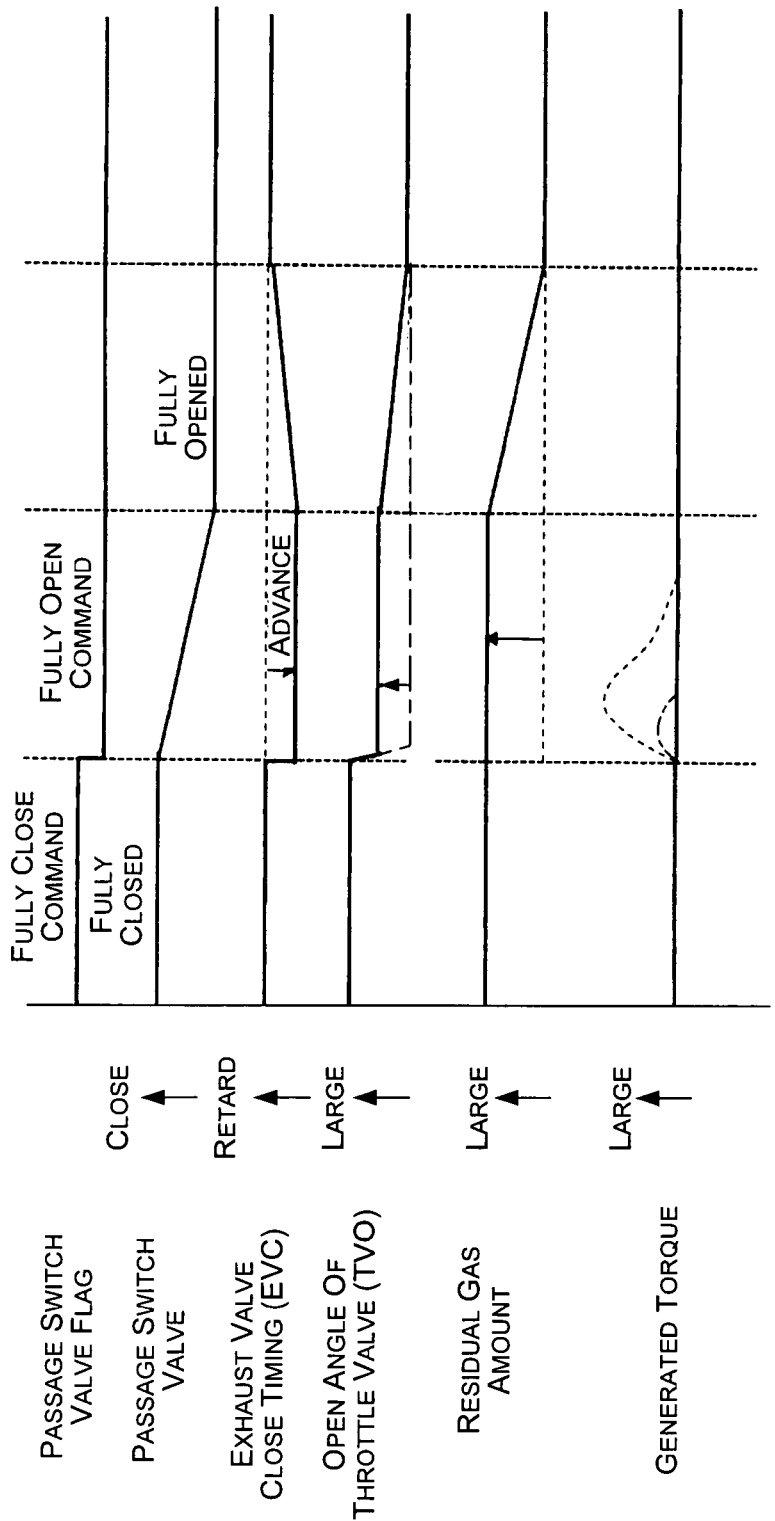
FIG. 2 is a timing chart for describing operations of various components of the internal combustion engine in accordance with the first embodiment of the present invention.

Referring now to FIGS. 1 and 2, the first embodiment of the present invention as applied to an inline four-cylinder internal combustion engine having an exhaust device will be explained in detail. FIG. 1 is a simplified schematic diagram of the internal combustion engine having the exhaust device. First, the overall arrangement of the exhaust device will be described referring to FIG. 1.

The internal combustion engine having the exhaust device of the first embodiment includes a cylinder head 1, a plurality of exhaust ports 2 (only one exhaust port 2 is shown in FIG. 1), a plurality of main passages 3 (only one main passage 3 is shown in FIG. 1), a main catalytic converter 4 (main catalyst), a passage switch valve 5 (the passage open/close unit), a plurality of bypass passages 7 (only one bypass passage 7 is shown in FIG. 1), a bypass catalytic converter 8 (bypass catalyst), an intake passage 9, a pair of air-fuel ratio sensors 10 and 11, a plurality of combustion chambers 13 (only one combustion chamber 13 is shown in FIG. 1), a plurality of intake valves 14 (only one intake valve 14 is shown in FIG. 1), an intake valve operating mechanism 15, a plurality of exhaust valves 16 (only one exhaust valve 16 is shown in FIG. 1), an exhaust valve operating mechanism 17, a throttle valve 18, a cylinder block 19, a plurality of pistons 20 (only one piston 20 is shown in FIG. 1), an EGR passage 21, an EGR valve 22, and a controller 50.

According to the internal combustion engine of the present invention, when the passage open/close unit (the passage switch valve 5) is changed from a closed state to an open state, the amount of residual gas inside the cylinders of the engine is controlled by selectively operating the residual gas amount changing section. Therefore, a change in the residual gas amount is suppressed at the time when the passage open/close unit (the passage switch valve 5) is being switched from the closed state to the open state. Accordingly, a difference in torque level can be prevented from occurring.

Each of the combustion chambers 13 is formed by the cylinder head 1, the cylinder block 19, and the piston 20. The combustion chamber 13 fluidly communicates the intake passage 9 in which the throttle valve 18 is arranged when the intake valve 14 is opened. In the cylinder head 1 defines the exhaust ports 2 of the cylinders #1 to #4 that are arranged inline so that the exhaust ports 2 open to side portions of the cylinders #1 to #4. Each of the main passage 3 is connected to each of the exhaust ports 2. The main passages 3 and the combustion chambers 13 fluidly communicate each other when the exhaust valves 16 are opened. The combustion chamber 13 is ventilated by selectively opening and closing the intake valve 14 and the exhaust valve 16, and the exhaust gas discharged from the combustion chamber 13 flows from the exhaust port 2 into the main passage 3. The main passages 3 of the four cylinders #1 to #4 merge into a single passageway, and the main catalytic converter 4 is disposed in the passageway on the downstream side as shown in FIG. 1. The main catalytic converter 4 is preferably arranged underneath a floor panel of a vehicle. The main catalytic converter 4 preferably has a relatively large capacity. The main catalytic converter 4 includes, for example, three-way catalysts and HC Trap catalysts. Thus, a main flow path of exhaust gas is formed by the main passages 3 and the main catalytic converter 4, in which the exhaust gas flows therein during a normal operation. The passage switch valve 5 is arranged in a portion of the passageway at which the four main passages 3 of each of the cylinders merge. The passage switch valve 5 is configured and arranged to selectively open or close the main passages 3 at once.

Moreover each of the bypass passages 7 is branched off from one of the main passages 3 of the cylinders at a branching point 6 as shown in FIG. 1. Each of the bypass passages 7 has a passage transverse cross-sectional area that is smaller than a transverse cross-sectional area of the main passage 3. The branching point 6, which is disposed at the upstream end of the bypass passage 7, is preferably set in a position as much to the upstream side of the main passage 3 as possible. The four bypass passages 7 merge into a single passageway at the downstream side, and the bypass catalytic converter 8 using a three-way catalyst is arranged immediately downstream of the merge point of the four bypass passages 7. The bypass catalytic converter 8 has a relatively small size and has a smaller capacity compared to the main catalytic converter 4. Moreover, the bypass catalytic converter 8 preferably has a good cold activation property. The downstream end of the bypass passage 7 that extends from an outlet side of the bypass catalytic converter 8 is connected at a merge point 12 on the upstream side of the main catalytic converter 4 in the main passage 3. The merge point 12 is disposed downstream of the passage switch valve 5 as shown in FIG. 1. More specifically, the passage switch valve 5 is arranged in a middle portion of the main passages 3 (downstream of a point where the main passages merge together) that are bypassed by the bypass passages 7.

The air-fuel ratio sensors 10 and 11 are arranged in an inlet portion of the main catalytic converter 4 and the inlet area of the bypass catalytic converter 8, respectively.

Moreover, the internal combustion engine is provided with an external EGR system including the EGR passage 21 that branches off from a middle portion of the main passage 3 to recirculate a portion of the exhaust gas back to the intake system, i.e., the intake passage 9. The EGR valve 22 is arranged in a middle portion of the EGR passage 21 and the EGR valve 22 is configured and arranged to selectively control the recirculated amount of the exhaust gas.

In the first embodiment of the present invention, the exhaust valve operating mechanism 17, that is configured and arranged to drive or operate the exhaust valves 16, preferably includes an exhaust valve side sprocket (not shown) and an exhaust valve side phase controlling actuator (not shown). The exhaust valve side sprocket is arranged on the front end portion of an exhaust valve side camshaft (not shown). The exhaust valve side phase controlling actuator is configured and arranged to operate the exhaust valve side sprocket and the exhaust valve side camshaft so that the exhaust valve side sprocket rotates with respect to the exhaust valve side camshaft rotate within a predetermined angular range. Thus, the exhaust valve operating mechanism 17 constitutes the exhaust valve close timing changing mechanism and the exhaust valve phase changing device (the phase variable device) in the preset invention. The exhaust valve side sprocket is configured and arranged to interlock with a crankshaft (not shown) via a timing chain or a timing belt (not shown). The exhaust valve side phase controlling actuator includes, for example, a hydraulic rotary actuator. The exhaust valve side sprocket is rotated with respect to the exhaust valve side camshaft by the exhaust valve side phase controlling actuator to retard or advance a lift center angle of the exhaust valves 16. In other words, the exhaust valve operating mechanism 17 is configured and arranged to selectively retard or advance the lift center angle while a curve (lobe) of the lift property of the exhaust valves 16 is not changed. Moreover, the exhaust valve operating mechanism 17 is configured and arranged to be able to gradually or continuously change the lift center angle of the exhaust valves 16.

By advancing or retarding the lift center angle of the exhaust valves 16, the close timing of the exhaust valves 16 changes, and thus, an amount of gas (residual gas) remaining inside the combustion chambers 13 changes. More specifically, if the close timing of the exhaust valves 16 is advanced, a larger amount of exhaust gas will be trapped inside of the combustion chambers 13. Therefore, the amount of residual gas inside the combustion chambers 13 increases. Since there is inertia of exhaust gas near the top dead center, an effect of suppressing the inertia by advancing the close timing of the exhaust valve can be obtained even in the intake stroke after the top dead center. However, by advancing the close timing of the exhaust valve in the exhaust stroke before the top dead center, it is possible to obtain an improved effect. Accordingly, the phase variable device (the exhaust valve phase changing device) of the exhaust valve operating mechanism 17 is an example of the exhaust valve close timing changing mechanism, and an example of the residual gas amount changing unit of the present invention. The exhaust valve operating mechanism 17 as explained above is a conventional component that is well known in the art. Since the exhaust valve operating mechanism 17 is well known in the art, these structures will not be discussed or illustrated in detail herein. Rather, it will be apparent to those skilled in the art from this disclosure that the component can be any type of structure and/or programming that can be used to carry out the present invention. In addition, the exhaust valve close timing changing mechanism and the residual gas amount changing unit are not limited to the exhaust valve operating mechanism 17 as explained above. For example, a conventional mechanism configured to change the open timing and close timing of the exhaust valve, as disclosed in U.S. Pat. No. 6,029,618, can be adapted as the exhaust valve close timing changing mechanism and the residual gas amount changing unit of the present invention.

The intake valve operating mechanism 15 is configured and arranged to drive or operate the intake valves 14. The intake valve operating mechanism 15 of the first embodiment has basically identical structures as the exhaust valve operating mechanism 17. In other words, the intake valve operating mechanism 15 is configured and arranged to selectively retard or advance the lift center angle of the intake valves 14 by the phase variable device. More specifically, the intake valve operating mechanism 15 is configured and arranged to selectively retard or advance the lift center angle while a curve (lobe) of the lift property of the intake valves 14 is not changed. Moreover, the intake valve operating mechanism 15 is configured and arranged to be able to gradually or continuously change the lift center angle of the intake valves 14.

By advancing or retarding the lift center angle of the intake valves 14, the open timing of the intake valves 14 changes, and thus, an amount of gas (residual gas) remaining inside the combustion chambers 13 changes. More specifically, by advancing the open timing of the intake valves 14, a larger amount of exhaust gas will be blown back to the intake passage side, and then by sucking the exhaust gas into the combustion chambers 13 again, the amount of residual gas inside the combustion chambers 13 is increased. Since there is inertia of exhaust gas near the top dead center, an effect of increasing an amount of the exhaust gas blown back into the intake passage 9 can be obtained by advancing the open timing of the intake valves 14 even in the intake stroke after the top dead center. However, by advancing the open timing of the intake valves 14 in the exhaust stroke before the top dead center, it is possible to obtain an improved effect. The phase variable device (the intake valve phase changing device) of the intake valve operating mechanism 15 is an example of the intake valve open timing changing mechanism, and an example of the residual gas amount changing unit of the present invention. Similarly to the exhaust valve operating mechanism 17, the intake valve operating mechanism 15 can be configured and arranged as a conventional mechanism that changes the open timing and the close timing of the intake valves. In addition, it is not necessary to provide the phase variable device in both of the intake side and the exhaust side in the present invention, and the phase variable device can be only provided at one of the intake side and the exhaust side. In the first embodiment of the present invention, an example is given in which only the exhaust valve operating mechanism 17 is operated to change the close timing of the exhaust valves 16 as discussed in more detail with referring to FIG. 2.

The controller 50 is operatively coupled to the passage switch valve 5, the intake valve operating mechanism 15, the exhaust valve operating mechanism 17, the throttle valve 18, the EGR valve 22, and the air-fuel ratio sensors 10 and 11. Moreover, the controller 50 is operatively coupled to other various components of the internal combustion engine such as an engine rotational speed sensor (not shown), an air flow meter (not shown), a fuel injection valve (not shown), and the like. The controller 50 is configured and arranged to control operations of the various components of the internal combustion engine such as the intake valve operating mechanism 15, the exhaust valve operating mechanism 17, the throttle valve 18, and the like according to the operation conditions of the internal combustion engine. For example, the controller 50 is configured to determine a fuel injection amount depending on the amount of intake air detected by the air flow meter so as to reach a target air-fuel ratio. Moreover, the controller 50 is configured to control the passage switch valve 5 during a low temperature condition in accordance with the first embodiment of the present invention as discussed in more detail below.

The controller 50 preferably includes a microcomputer with a residual gas amount control program that controls the intake valve operating mechanism 15 and/or the exhaust valve operating mechanism 17 as discussed below. The controller 50 can also include other conventional components such as an input interface circuit, an output interface circuit, and storage devices such as a ROM (Read Only Memory) device and a RAM (Random Access Memory) device. The memory circuit stores processing results and control programs such as ones for the residual gas amount control operation that are run by the processor circuit. The controller is operatively coupled to the various components of the internal combustion engine in a conventional manner. The internal RAM of the controller 50 stores statuses of operational flags and various control data. The controller 50 is capable of selectively controlling any of the components of the control system in accordance with the control program. It will be apparent to those skilled in the art from this disclosure that the precise structure and algorithms for the controller 50 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

In the internal combustion engine of the first embodiment of the present invention, during the cold temperature condition in which the engine temperature or the exhaust gas temperature is low after cold starting or the like, the controller 50 is configured to close the passage switch valve 5 via an appropriate actuator to block the main passage 3. Therefore, the entire amount of the exhaust gas discharged from each of the combustion chambers 13 flows into the bypass catalytic converter 8 via the bypass passages 7 from the branching point 6. As mentioned above, the bypass catalytic converter 8 is positioned near the exhaust ports 2 or on the upstream side of the exhaust system. Since the bypass catalytic converter 8 has a relatively small size, the activation of the bypass catalytic converter 8 can be achieved relatively quickly. Thus, the purification of the exhaust gas by the bypass catalytic converter begins relatively early during the cold temperature condition.

On the other hand, as the internal combustion engine warms up, the engine temperature or the exhaust gas temperature becomes sufficiently high. Then, the controller 50 is configured to open the passage switch valve 5. As a result, the majority of exhaust gas discharged from each of the combustion chambers 13 flows into the main catalytic converter 4 from the main passage 3. During this time, the bypass passages 7 are not blocked. However, as mentioned above, the passage transverse cross-sectional area of the bypass passages 7 is smaller than the transverse cross-sectional area of the main passages 3. Moreover, the bypass catalytic converter 8 is disposed in the bypass passage 7. Therefore, due to the difference of the passage resistance of the bypass passages 7 and the main passages 3, most of the exhaust gas stream flows into the main passages 3, and little of the exhaust gas flows into the bypass passages 7. Therefore, thermal degradation of the bypass catalytic converter 8 is sufficiently suppressed.

When the passage switch valve 5 is operated to open the main passage 3 as described above, since the passage resistance of the main passage 3 becomes small upon opening of the passage switch valve 5, the pressure of the exhaust gas decreases rapidly. Therefore, the amount of residual gas inside the combustion chambers 13 is also rapidly reduced. In such case, the torque instantaneously rises and a sudden change in the torque level occurs. More specifically, residual gas remained in the combustion chambers 13 when the pressure of the exhaust gas is high is reduced by the decrease in pressure of the exhaust gas, and at the same time the amount of intake air increases causing the residual gas being replaced by intake air (new air) at once. Therefore, an increase in the torque occurs due to the fuel supply corresponding to the amount of the intake air.

Accordingly, in the first embodiment of the present invention, the controller 50 is configured to adjust the valve close timing of the exhaust valves 16 in an advancing side to trap the residual gas remaining inside the combustion chambers 13 when the passage switch valve 5 opens. Therefore, even if a drastic decrease in the pressure inside the main passage 3 occurred, the drastic change in the amount of residual gas inside the combustion chambers 13 is suppressed and the instantaneous increase of torque is prevented. In other words, in the first embodiment, the controller 50 is configured to maintain the amount of residual gas to be substantially constant when switching the passage switch valve 5 from a closed condition (closed state) to an opened condition (open state) by appropriately controlling the residual gas amount changing unit (including the exhaust valve operating mechanism 17, the intake valve operating mechanism 15 and the like) that is normally used for changing the residual gas amount during normal conditions (i.e., conditions in which the passage switch valve 5 is not operated).

FIG. 2 is a timing chart for describing various operations in the first embodiment of the present invention. In FIG. 2, the solid lines represent the characteristic lines in the first embodiment of the present invention in which the valve close timing of the exhaust valves 16 is adjusted to the advancing side, and dashed lines represent the characteristics in a first comparative example in which the valve close timing of the exhaust valves 16 is not adjusted to the advancing side. As shown in FIG. 2, the amount of residual gas inside the combustion chambers 13 changes to a step shape in the first comparative example when the passage switch valve 5 switches from a fully closed condition to a fully opened condition. In addition, alternate long and short dash lines in FIG. 2 represent a second comparative example in which a valve opening angle of the throttle valve 18 arranged in the intake passage 9 is adjusted to be an large amount in the valve closing direction as compared to the valve opening angle of the first embodiment when the passage switch valve 5 is switched from the closed condition to the opened condition.

When the internal combustion engine is sufficiently warmed up from the cold temperature condition, a control command issued by the controller 50 to the passage switch valve 5 changes from a fully close command to a fully open command (i.e., an example in which a passage opening condition is satisfied). Thus, the passage switch valve 5 starts to open at this timing. At this time, in order to maintain a substantially constant amount of residual gas inside the combustion chambers 13, the controller 50 is configured to adjust the valve close timing of the exhaust valves 16 to the advancing side by operating the exhaust valve operating mechanism 17. At the same time, the controller 50 is configured to adjust the valve open angle of the throttle valve 18 to a close valve side. In other words, when the passage switch valve 5 is switched from the fully closed condition to the fully opened condition, the valve close timing of the exhaust valves 16 are adjusted to the advancing side (i.e., the valve close timing of the exhaust valve is advanced) and the valve open angle of the above described throttle valve is adjusted to a close valve side in order to maintain a substantially constant amount of residual gas inside the combustion chambers 13 as shown in FIG. 2.

As mentioned above, the passage resistance of the main passage 3 decreases at once when the passage switch valve 5 is slightly opened. Even though the open angle of the passage switch valve 5 is small, a considerable rate of exhaust gas starts to flow in the main passage 3, and thus, the pressure of the exhaust gas is decreased drastically. As a result of the pressure of the exhaust gas being decreased drastically, the amount of residual gas inside the combustion chambers 13 is reduced rapidly as described above, and thus, torque rises instantaneously and a sudden change in torque level occurs. Therefore, in the first embodiment of the present invention, the controller 50 is configured to operate the exhaust valve operating mechanism 17 and the throttle valve 18 such that the operating/performing times of the exhaust valves 16 and the throttle valve 18 become considerably shorter compared to the operating/performing time of the passage switch valve 5. Thus, the exhaust valves 16 and the throttle valve 18 are operated all at once to handle the drastic change of the pressure of the exhaust gas in the first embodiment of the present invention.

Thus, as shown in FIG. 2, the instant that the passage switch valve 5 is opened, the valve close timing of the exhaust valves 16 is advanced all at once to cancel out the fluctuation of residual gas inside the combustion chambers 13 in the first embodiment of the present invention. Therefore, the residual gas inside the combustion chambers 13 is maintained at a substantially constant amount when the passage switch valve 5 starts to open from a fully close condition. It is then possible to obtain a generated torque of the internal combustion engine that is substantially constant without a sudden change in torque level as shown in FIG. 2. In addition, in the first embodiment, the amount of adjustment in the valve opening angle of the throttle valve 18 toward the valve close side immediately after the passage switch valve 5 is opened is less compared to the second comparative example.

When the passage switch valve 5 is fully opened, the controller 50 is then configured to gradually change the valve open degree of the throttle valve 18 to the close valve direction while adjusting the valve close timing of the exhaust valves 16, which was advanced, to return to the retarding side as shown in FIG. 2. In other words, the valve timing of the exhaust valves 16, which has been changed to the advancing side, is changed in cooperation with operation of the throttle valve 18 to be returned to the retarding side after the passage switch valve 5 is fully opened. Therefore, by controlling the amount of residual gas inside the combustion chambers 13 via the exhaust valve operating mechanism 17, it is possible to change the amount of residual gas inside the combustion chambers 13 in a more gradual manner, and to prevent a sudden change in the torque level from occurring. In other words, it is possible to control the amount of residual gas inside the combustion chambers 13 without being affected by the open/closing speed (switching speed) of the passage switch valve 5. Therefore, for example, it becomes possible to adopt a driving type of actuator that cannot control the valve open/close speed as the driving source of the passage switch valve 5. Thus, it is possible to reduce the cost, with more freedom in selecting the actuator used as the driving source of the passage switch valve 5.

Although, in the first embodiment, when opening the passage switch valve 5, the valve close timing of the exhaust valves 16 is adjusted to the advancing side, the present invention is not limited to this arrangement. Instead of adjusting the valve close timing of the exhaust valves 16 to the advancing side, it is possible to obtain the same effect as the first embodiment by adjusting the valve open timing of the intake valves 14 to the advancing side by controlling the intake valve operating mechanism 15. In such case, as described above, the intake valve operating mechanism 15 that drives the intake valves 14 includes the phase variable device that is configured and arranged to selectively advance or retard the lift center angle the intake valves 14. Thus, when the passage switch valve 5 is fully opened, the valve open timing of the intake valves 14 is returned toward the retarded side in harmony with the adjustment of the valve opening angle of the throttle valve 18 disposed in the intake passage 9. The valve close timing of the intake valves 14 affects the intake efficiency inside the cylinders of the internal combustion engine. Therefore, the valve open timing of the intake valves 14 is preferably adjusted to the advancing side while maintaining the valve close timing of the intake valves 14 in a region that does not cause an excessive increase in the intake effect that cancels the torque suppressive effect by maintaining the residual gas amount. For example, the valve open timing of the intake valves 14 is adjusted to the advancing side, while having the valve close timing of the intake valves 14 to be such timing that at least the angle (the valve close timing) from the bottom dead center after adjustment does not become smaller than the angle (the valve close timing) from the bottom dead center before the adjustment.

In addition, when the passage switch valve 5 is switched from the closed condition to the opened condition, it is possible to obtain the same effect as the first embodiment by adjusting the valve close timing of the exhaust valves 16 to the advancing side and at the same time adjusting the valve open timing of the intake valves 14 to the advancing side. In such case, both the intake valve operating mechanism 15 that drives the intake valves 14 and the exhaust valve operating mechanism 17 that drives the exhaust valves 16 include the phase variable devices that are configured and arranged to selectively advance or retard the lift center angles of the intake valves 14 and the exhaust valves 16, respectively. When the passage switch valve 5 is fully opened, both of the valve close timing of the exhaust valves 16 and the valve open timing of the intake valves 14 are returned toward the retarding side in harmony with the operation of the throttle valve 18.

With the internal combustion engine in accordance with the first embodiment, the bypass passages 7 are arranged in parallel with an upstream side portion of the main passages 3 having the main catalytic converter 4 at the downstream side thereof. The transverse cross-sectional areas of the bypass passages 7 are relatively small compared to the transverse cross-sectional areas of the main passages 3. The bypass catalytic converter 8 is disposed in the bypass passage 7. In addition, in the exhaust device of the internal combustion engine includes the passage switch valve 5 that selectively blocks off the main passage 3 at the upstream side portion that is bypassed by the bypass passage 7. The residual gas amount is maintained to be substantially constant by the residual gas amount changing unit when the passage switch valve 5 switches from a closed condition to an opened condition. In the first embodiment, the residual gas amount changing unit comprises the exhaust valve close timing changing mechanism configured and arranged to advance the exhaust valve close timing in order to maintain the amount of residual gas at substantially constant amount. As a result, the residual gas amount inside the combustion chambers 13 is controlled by controlling the valve close timing of the exhaust valves 16, and a change in the amount of residual gas is suppressed when the passage switch valve 5 is switched from a close valve condition to an open valve condition. Furthermore, since it is possible to gradually control the residual gas amount in the first embodiment, it is possible to prevent a sudden change in the torque level from occurring.

The exhaust device of the internal combustion engine in accordance with the first embodiment includes the phase variable device (the exhaust valve operating mechanism 17) that adjusts the phase of the lift center angle of the exhaust valves 16 to the advancing side in order to advance the exhaust valve close timing.

In addition, the residual gas amount changing unit can include the intake valve open timing changing mechanism (the intake valve operating mechanism 15) that advances the intake valve open timing in order to maintain the residual gas amount at a substantially constant level when the passage switch valve 5 switches from a closed condition to an opened condition.

The exhaust device of the internal combustion engine in accordance with the first embodiment can include the phase variable device that adjusts the phase of the lift center angle of the intake valves 14 to the advancing side in order to advance the intake valve open timing.

In addition, the residual gas amount changing unit can include the exhaust valve close timing changing mechanism (the exhaust valve operating mechanism 17) and the intake valve open timing changing mechanism (the intake valve operating mechanism 15) that are configured and arranged to advance the exhaust valve close timing and the intake valve open timing, respectively, in order to maintain the residual gas amount at a substantially constant level when the passage switch valve 5 switches from a closed condition to an opened condition.

The exhaust device of the internal combustion engine in accordance with the first embodiment can include the phase variable devices that adjust the phase of the lift center angle the exhaust valves 16 and the intake valves 14 to the advancing side in order to advance the exhaust valve close timing and the intake valve open timing.

In the exhaust device of the internal combustion engine according to the first embodiment, the valve timing that is changed to the advancing side returned toward the retarding side is in harmony with operation of the throttle valve 18 after the passage switch valve 5 is fully opened. As a result, since it is possible to control the amount of residual gas inside the combustion chambers 13 without being affected by the valve open/close speed (switch speed) of the passage switch valve 5, it becomes possible to adopt a driving type of actuator that cannot control the valve open/close speed as the driving source of the passage switch valve 5. Therefore, it is possible to reduce the cost, with more freedom in selecting the actuator to be used as the driving source of the passage switch valve.

Second Embodiment

Figure 3:
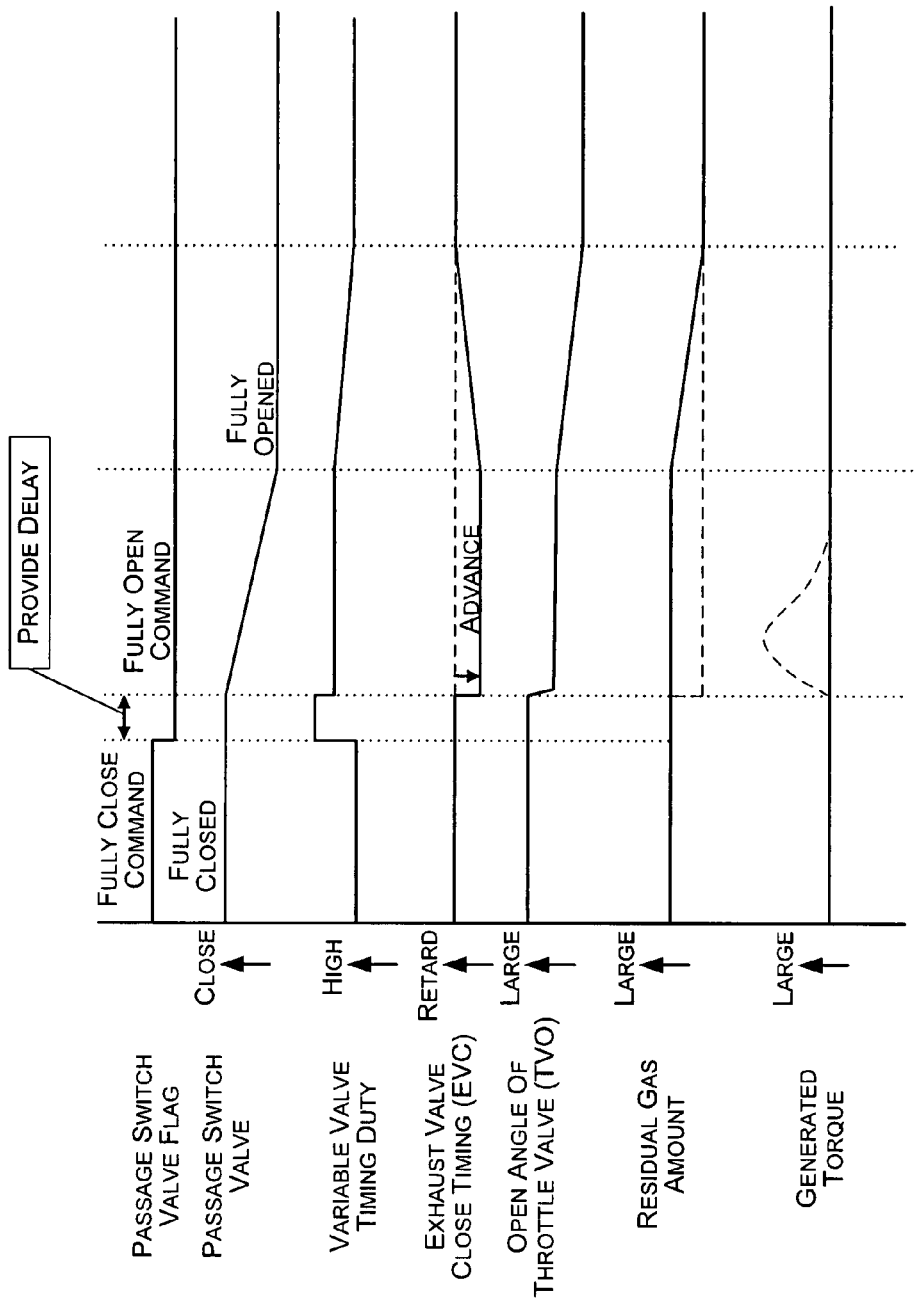
FIG. 3 is a timing chart for describing operations of various components of an internal combustion engine in accordance with a second embodiment of the present invention.

Referring now to FIG. 3, an internal combustion engine in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The structures of the internal combustion engine of the second embodiment are basically identical to the structures of the internal combustion engine of the first embodiment illustrated in FIG. 1. However, the second embodiment differs from the first embodiment in the control executed in the controller 50. More specifically, the control executed in the second embodiment of the present invention is basically identical to the control executed in the first embodiment explained above except that, in the second embodiment, the operating duty (variable valve timing duty) for an actuator that controls the exhaust valve phase of the exhaust valve operating mechanism 17 is increased in advance by taking into account the responsiveness of the actuator.

FIG. 3 is a timing chart used for describing various operations in the second embodiment of the present invention. In FIG. 3, solid lines represent the characteristic lines in the second embodiment of the present invention, and dashed lines represent characteristic lines of a third comparative example in which the valve close timing of the exhaust valves 16 is not adjusted to the advancing side when the passage switch valve 5 changes from a fully close condition to a fully open condition. As shown in FIG. 3, the amount of residual gas inside the combustion chambers 13 changes in a step shape in the third comparative example.

As shown in FIG. 3, in the second embodiment, when the control command issued to the passage switch valve 5 is changed from a fully close command to a fully open command, the operating duty (variable valve timing duty) of the actuator of the exhaust valve operating mechanism 17 is increased before the passage switch valve 5 starts opening. Thus, the operating duty of the actuator that controls the exhaust valve phase is raised in advance prior to commencement of valve opening operation of the passage switch valve 5. In other words, a prescribed delay is provided between the time at which the control command to the passage switch valve 5 changes from the fully close command to the fully open command and the time at which the passage switch valve 5 actually starts opening as shown in FIG. 3. Therefore, in addition to the effects obtained in the first embodiment, it is possible to improve the responsiveness of the adjustment (switch) of the valve close timing of the exhaust valves 16 to the advanced side in the second embodiment. Accordingly, change in the amount of residual gas inside the combustion chambers 13 is further reduced. Thus, it is possible to reliably prevent a sudden change in the torque level from occurring.

Similarly to the first embodiment, in the second embodiment, when opening the passage switch valve 5, the valve close timing of the exhaust valves 16 is adjusted to the advancing side, the present invention is not limited to this arrangement. Instead of adjusting the valve close timing of the exhaust valves 16 to the advancing side, it is possible to obtain the same effect as the first embodiment by adjusting the valve open timing of the intake valves 14 to the advancing side by controlling the intake valve operating mechanism 15. In such case, the operating duty of an actuator that controls the intake valve phase of the intake valve operating mechanism 15 is preferably raised in advance prior to commencement of valve opening operation of the passage switch valve 5. Thus, as described above, the intake valve operating mechanism 15 that drives the intake valves 14 includes the phase variable device that is configured and arranged to selectively advance or retard the lift center angle the intake valves 14. Thus, when the passage switch valve 5 is fully opened, the valve open timing of the intake valves 14 is returned toward the retarded side in harmony with the adjustment of the valve opening angle of the throttle valve 18 disposed in the intake passage 9.

In addition, when the passage switch valve 5 is switched from the closed condition to the opened condition, it is possible to obtain the same effect as the second embodiment by adjusting the valve close timing of the exhaust valves 16 to the advancing side and at the same time adjusting the valve open timing of the intake valves 14 to the advancing side. In such case, the operating duty of both of the actuators that control the exhaust valve phase and the intake valve phase are preferably raised in advance prior to commencement of valve opening operation of the passage switch valve 5. Thus, both the intake valve operating mechanism 15 that drives the intake valves 14 and the exhaust valve operating mechanism 17 that drives the exhaust valves 16 include the phase variable devices that are configured and arranged to selectively advance or retard the lift center angles of the intake valves 14 and the exhaust valves 16, respectively. When the passage switch valve 5 is fully opened, both of the valve close timing of the exhaust valves 16 and the valve open timing of the intake valves 14 are returned toward the retarding side in harmony with the operation of the throttle valve 18.

The similar effects described in the first embodiment can be obtained in the second embodiment of the present invention. In addition, in the exhaust device of the internal combustion engine in accordance with the second embodiment, when the control command to the passage switch valve 5 is issued to switch the passage switch valve 5 from a closed condition to an opened condition, the operating duty (variable valve timing duty) with respect to the phase variable device is increased before commencement of the valve opening operation of the passage switch valve 5. As a result, it is possible to improve the responsiveness of the switch of the valve close timing of the exhaust valves 16 to the advancing side. Moreover, a change in the amount of residual gas inside the combustion chambers 13 is further reduced. Thus, it is possible to reliably prevent a sudden change in the torque level from occurring.

Third Embodiment

Figure 4:
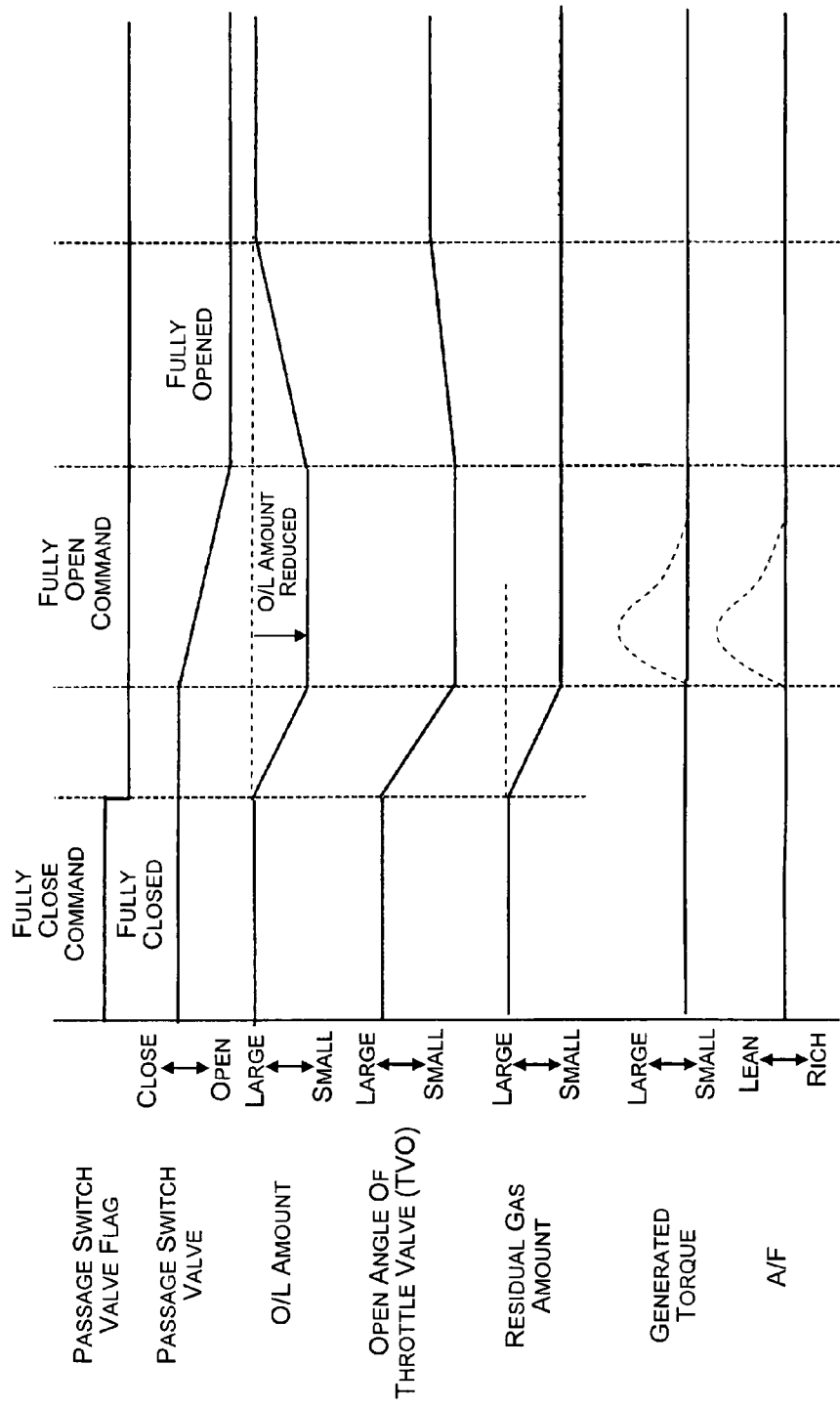
FIG. 4 is a timing chart for describing operations of operations of various components of an internal combustion engine in accordance with a third embodiment of the present invention.

Referring now to FIG. 4, an internal combustion engine in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

The structures of the internal combustion engine of the third embodiment are basically identical to the structures of the internal combustion engine of the first embodiment illustrated in FIG. 1. However, the third embodiment differs from the first embodiment in the control executed in the controller 50. More specifically, the control executed in the third embodiment of the present invention is basically identical to the control executed in the first embodiment explained above except that, in the third embodiment, a control is executed to gradual reduce the residual gas in the combustion chambers 13 prior to the passage switch valve 5 is switched from the closed condition to the open condition in order to prevent the sudden deference in torque level from occurring.

More specifically, in the third embodiment, the controller 50 is configured to control the intake valve operating mechanism 15 and/or the exhaust valve operating mechanism 17 to reduce a valve overlap amount (O/L amount) from the intake valve open timing to the exhaust valve close timing (i.e., a period when both the intake valves 14 and the exhaust valves 16 are open) prior to commencement of valve opening operation of the passage switch valve 5. Thus, the amount of residual gas inside the combustion chambers 13 is reduced before the passage switch valve 5 starts opening. Therefore, an instantaneously increase in the torque is prevented from occurring, which is caused by the pressure inside the main passage 3 being rapidly reduced and the amount of residual gas inside the combustion chambers 13 being replaced with new air.

In other words, in the third embodiment, the controller 50 is configured to suppress change in the amount of residual gas when switching the passage switch valve 5 from a closed condition to an opened condition by controlling the residual gas amount changing unit (including the intake valve operating mechanism 15 and the exhaust valve operating mechanism 17) that is normally used for changing the residual gas amount during normal conditions (i.e., when the passage switch valve 5 is not operated) such that the amount of residual gas is reduced in advance before commencement of the valve opening operation of the passage switch valve 5 (in case where the passage opening condition is satisfied).

FIG. 4 shows a timing chart used for describing the various operations in the third embodiment of the present invention.

As shown in FIG. 4, the controller 50 is configured to gradually reduce the valve overlap amount by adjusting the exhaust valve close timing and the intake valve open timing upon the control command to the passage switch valve 5 changes from the fully close command to the fully open command after the internal combustion engine is sufficiently warmed up (an example of when a passage opening condition is satisfied). More specifically, the controller 50 is configured to gradually reduce the valve overlap amount before the passage switch valve 5 actually starts opening (i.e., prior to switching of the passage switch valve 5 from the closed state to the open state) to gradually reduce the amount of residual gas inside the combustion chambers 13 in advance as shown in FIG. 4. Also, the controller 50 is further configured to gradually reduce the valve open angle of the throttle valve 18 disposed in the intake passage 9 so that an almost constant amount of new air is maintained inside the combustion chambers 13 thereby suppressing the changes in torque. The controller 50 is preferably configured to gradually reduce the valve overlap amount so that the amount of residual gas inside the combustion chambers 13 reaches a predetermined value (residual gas threshold) that is set in advance.

The controller 50 is configured to reduce the valve overlap amount by, for example, advancing only the close timing of the exhaust valves 16 with the exhaust valve phase controlling actuator (the exhaust valve operating mechanism 17) while the valve opening timing of the intake valves 14 is fixed, or by retarding only the open timing of the intake valves 14 with the intake valve phase controlling actuator (the intake valve operating mechanism 15) while the close timing of the exhaust valves 16 is fixed. Of course, it is also possible to gradually reduce the valve overlap amount by advancing the exhaust valve close timing and at the same time retarding the intake valve open timing. Then, after the amount of residual gas inside the combustion chambers 13 is reduced to the residual gas threshold, the controller 50 is configured to start opening the passage switch valve 5. Therefore, the valve overlap changing mechanism of the third embodiment includes the intake valve operating mechanism 15 and/or the exhaust valve operating mechanism 17, and the valve overlap changing mechanism also constitutes the residual gas amount changing unit.

As a result, the amount of residual gas inside the combustion chambers 13 is reduced before the passage switch valve 5 starts opening from a fully closed condition. Therefore, even if the pressure of the exhaust gas reduces when the passage switch valve 5 starts opening, the amount of residual gas inside the combustion chambers 13 will not be reduced rapidly. In other words, it is possible to prevent the intake efficiency from relatively increasing with the amount of residual gas inside the combustion chambers 13 being replaced with new air. Therefore, it is possible to obtain a generated torque of the internal combustion engine that is substantially constant without a sudden change in torque level.

Thus, it is also possible to suppress an air-fuel ratio fluctuation (A/F fluctuation) due to a rapid decrease of the amount of residual gas inside the combustion chambers 13 when the passage switch valve 5 starts opening. It is possible to prevent a sudden change in torque level due to the air-fuel ratio fluctuation, and thus, the degradation of the exhaust performance can be prevented.

Furthermore, by controlling the amount of residual gas inside the combustion chambers 13 by reducing the valve overlap amount, the amount of residual gas inside the combustion chambers 13 can be controlled without being affected by the valve open/close speed (switch speed) of the passage switch valve 5. Therefore, for example, it becomes possible to adopt a driving type of actuator that cannot control the valve open/close speed as the driving source of the passage switch valve 5. It is possible to reduce the cost, with more freedom in selecting the actuator to be used as the driving source of the passage switch valve 5.

After the passage switch valve 5 is fully opened, the controller 50 is configured to gradually increase the valve overlap amount until the valve overlap amount used before the fully open command was issued to the passage switch valve 5 as shown in FIG. 4. At the same time, the controller 50 is configured to gradually increase the valve open angle of the throttle valve 18 until the valve open angle of the throttle valve 18 becomes smaller than the valve open angle used before that of the state before the fully open command was issued to the passage switch valve 5 as shown in FIG. 4. Therefore, the controller 50 is configured to gradually increase the valve open angle of the throttle valve 18 while gradually increasing the valve overlap amount. Thus, it is possible to suppress a torque fluctuation when returning the valve overlap amount to the valve overlap amount used before the fully open command was issued to the passage switch valve 5.

In addition, in FIG. 4, the air-fuel ratio (A/F) and the generated torque indicated with dashed lines represent a fourth comparative example in which the valve overlap amount is not reduced and the amount of residual gas inside the combustion chambers 13 is reduced rapidly and replaced by new air.

With the internal combustion engine in accordance with the third embodiment, the bypass passages 7 are arranged in parallel with an upstream side portion of the main passages 3 having the main catalytic converter 4 at the downstream side thereof. The transverse cross-sectional areas of the bypass passages 7 are relatively small compared to the transverse cross-sectional areas of the main passages 3. The bypass catalytic converter 8 is disposed in the bypass passage 7. In addition, in the exhaust device of the internal combustion engine includes the passage switch valve 5 that selectively blocks off the main passage 3 at the upstream side portion that is bypassed by the bypass passage 7. The controller 50 is configured to reduce the residual gas in advance when the passage switch valve 5 switches from a closed condition to an opened condition. More specifically, the controller 50 is configured to control the intake valve operating mechanism 15 and/or the exhaust valve operating mechanism 17 to gradually reduce the valve overlap amount in advance before the passage switch valve 5 starts opening in the case when there is a valve overlap amount between the exhaust valve close timing and the intake valve open timing. As a result, the amount of residual gas inside the combustion chambers 13 is reduced before the passage switch valve 5 starts opening, and the amount of residual gas inside the combustion chambers 13 will not be reduced rapidly even if the pressure of the exhaust gas is reduced when the passage switch valve 5 switches from a closed condition to an open condition. In other words, it is possible to prevent the intake efficiency from relatively increasing with the amount of residual gas inside the combustion chambers 13 replaced with new air, when the passage switch valve 5 switches from a closed condition to an opened condition. It is then possible to obtain a generated torque of the internal combustion engine that is substantially constant without a sudden change in torque level.

The internal combustion engine in accordance with the third embodiment described above can be configured and arranged to reduce the valve overlap amount by retarding the intake valve open time. Moreover, the internal combustion engine in accordance with the third embodiment described above can be configured and arranged to reduce the valve overlap amount by advancing the exhaust valve close time. Also, the internal combustion engine in accordance with the third embodiment described above can be configured and arranged to effectively eliminate the valve overlap by advancing the exhaust valve close timing to match the intake valve opening timing or until the exhaust valve close timing more advanced than the intake valve open timing.

Moreover, the internal combustion engine in accordance with the third embodiment described above can be configured and arranged to gradually reduce the valve open angle of the throttle valve 18 while gradually reducing the valve overlap amount.

The internal combustion engine in accordance with the third embodiment is configured and arranged to gradually increase the valve overlap amount to the valve overlap amount used before the switching of the passage switch valve 5 from a closed condition to an opened condition after the passage switch valve 5 is fully opened, and at the same time to gradually increase the valve open angle of the throttle valve 18. As a result, it is possible to suppress the torque fluctuation when increasing the valve overlap amount.

Fourth Embodiment

Figure 5:
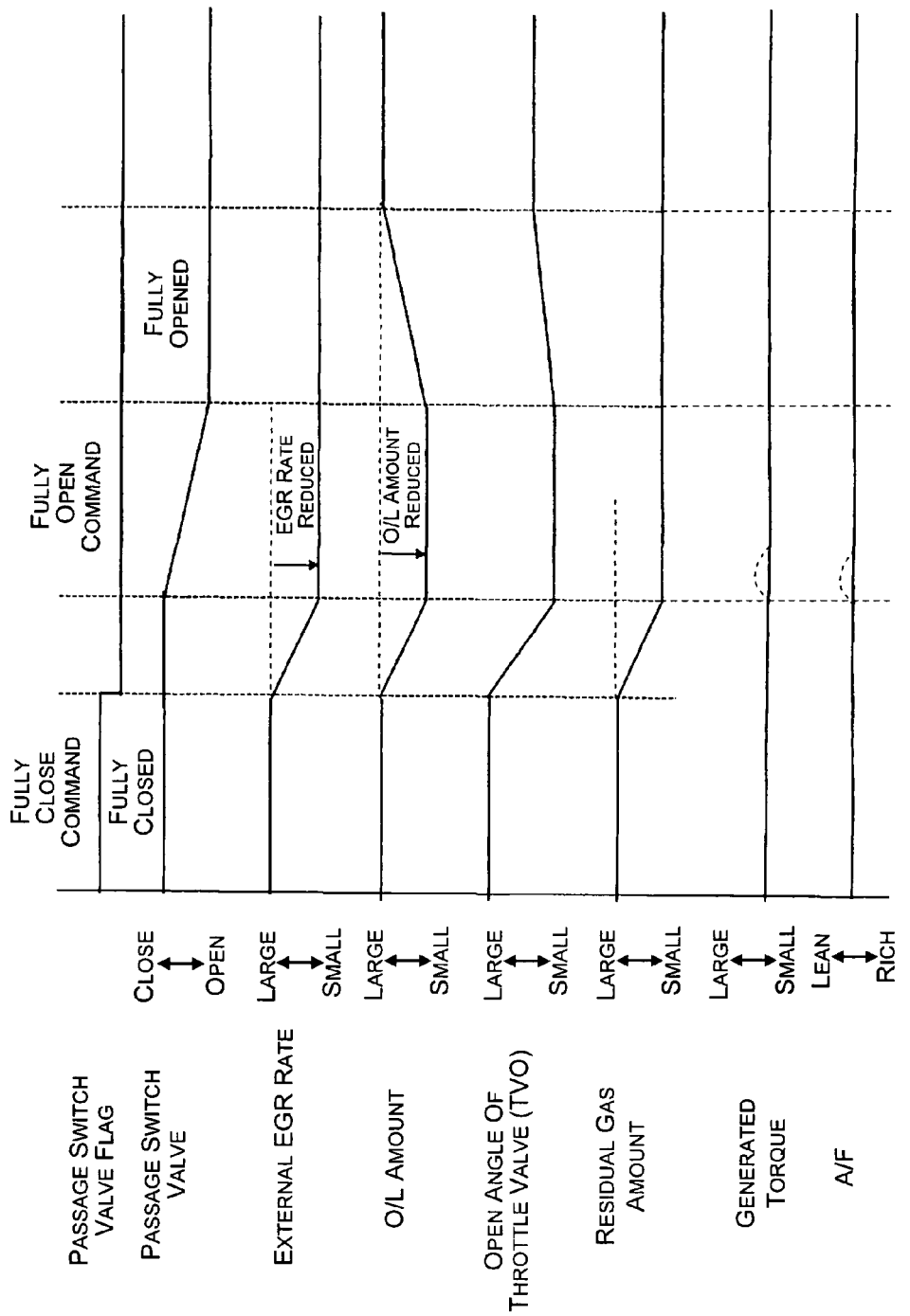
FIG. 5 is a timing chart for describing operations of operations of various components of an internal combustion engine in accordance with a fourth embodiment of the present invention.

Referring now to FIG. 5, an internal combustion engine in accordance with a fourth embodiment will now be explained. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity.

FIG. 5 shows a timing chart used to describe various operations in the fourth embodiment of the present invention.

The structures of the internal combustion engine of the fourth embodiment are basically identical to the structures of the internal combustion engine of the first embodiment illustrated in FIG. 1. However, the fourth embodiment differs from the first embodiment in the control executed in the controller 50. More specifically, the control executed in the fourth embodiment of the present invention is basically identical to the control executed in the third embodiment explained above except that, in the fourth embodiment, in addition to reducing the valve overlap amount, the controller 50 is further configured to gradually reduce the external EGR before the passage switch valve 5 starts opening (i.e., prior to switching of the passage switch valve 5 from the closed state to the open state). More specifically, in the fourth embodiment, the EGR system illustrated in FIG. 1 is configured and arranged to recirculate the exhaust gas to the intake system (the intake passage 9), and the controller 50 is configured to control the EGR valve 22 to control the flow rate of a portion of the exhaust gas recirculated from the upstream side of the branching point 6 (FIG. 1) to the intake system.

More specifically, when the control command to the passage switch valve 5 changes from the fully close command to the fully open command after the internal combustion engine is sufficiently warmed up (an example of when a passage opening condition is satisfied), the controller 50 is configured to gradually reduce the valve overlap amount as discussed in the third embodiment before the passage switch valve 5 start opening in order to reduce the amount of residual gas inside the combustion chambers 13 in advance. At the same time, the controller 50 is configured to gradually reduce the valve open angle of the throttle valve 18 disposed in the intake passage 9. In addition, in the fourth embodiment, the controller 50 is further configured to gradually reduce the external EGR rate by controlling the external EGR device (e.g., the EGR valve 22). Thus, the amount of the residual gas inside the combustion chambers 13 can be gradually reduced before the passage switch valve 5 starts opening.

In FIG. 5, the air-fuel ratio (A/F) and the generated torque indicated with dashed lines represent a fifth comparative example in which the external EGR rate is not reduced and the amount of residual gas inside the combustion chambers 13 is reduced rapidly and replaced by new air.

In addition, in the third and fourth embodiments described above, there is a slight possibility that the change in the pressure of the exhaust gas when switching the passage switch valve 5 from a fully close condition to a fully open condition may become resistance change during the exhaust operation. Therefore, when switching the passage switch valve 5 from a fully close condition to a fully open condition, the valve open angle of the throttle valve 18 may be reduced little by little.

Furthermore, the controller 50 may be configured to reduce the valve overlap amount until the exhaust valve close timing matches the intake valve close timing, or until the exhaust valve close timing becomes more advanced then the intake valve close timing (effectively eliminate valve overlap) instead of reducing the valve overlap amount to the valve overlap threshold.

In the fourth embodiment, it is possible to obtain the similar effects as the third embodiment described above.

The internal combustion engine according to the fourth embodiment includes the EGR device configured and arranged to control the flow rate of a portion of the exhaust gas and recirculate the exhaust gas to the intake system in the case that external EGR is performed the EGR device to the intake system. The controller 50 is configured to gradually reduce the external EGR rate before the passage switch valve starts opening when the passage switch valve 5 switches from a closed condition to an opened condition.

The internal combustion engine according to the fourth embodiment is further configured to gradually reduce the external EGR rate and at the same time to gradually reduce the valve open angle of the throttle valve 18 while gradually reducing the valve overlap amount.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An internal combustion engine comprising:
   an intake valve configured and arranged to selectively open to introduce fresh air into a combustion chamber;
   an exhaust valve configured and arranged to selectively open to release exhaust gas from the combustion chamber;
   a main passage fluidly coupled to the combustion chamber to discharge the exhaust gas from the combustion chamber;
   a main catalyst disposed in the main passage;
   a bypass passage bypassing the main passage on an upstream side of the main catalyst, the bypass passage having a transverse cross-sectional area that is smaller than a transverse cross-sectional area of the main passage;
   a bypass catalyst disposed in the bypass passage;
   a passage open/close unit disposed in a portion of the main passage bypassed by the bypass passage and configured and arranged to switch between an open state and a closed state to selectively open or selectively close the main passage;
   a residual gas amount changing unit configured and arranged to change an amount of residual gas remaining inside the combustion chamber; and
   a controller configured to control the residual gas amount changing unit when a passage opening condition for switching the passage open/close unit from the closed state to the open state is satisfied, the controller being configured to control the residual gas amount changing unit to maintain a substantially constant amount of the residual gas between before and after the passage open/close unit is switched from the closed state to the open state,
   with the residual gas amount changing unit including an exhaust valve close timing changing mechanism configured and arranged to change a close timing of the exhaust valve, and the controller being configured to control the exhaust valve close timing changing mechanism to advance the exhaust valve close timing when the passage open/close unit is switched from the closed state to the open state.

2. The internal combustion engine as recited in claim 1, wherein
   the exhaust valve close timing changing mechanism includes an exhaust valve phase changing device configured and arranged to advance a phase of a center lift angle of the exhaust valve to advance the exhaust valve close timing.

3. An internal combustion engine comprising:
   an intake valve configured and arranged to selectively open to introduce fresh air into a combustion chamber;
   an exhaust valve configured and arranged to selectively open to release exhaust gas from the combustion chamber;
   a main passage fluidly coupled to the combustion chamber to discharge the exhaust gas from the combustion chamber;
   a main catalyst disposed in the main passage;
   a bypass passage bypassing the main passage on an upstream side of the main catalyst, the bypass passage having a transverse cross-sectional area that is smaller than a transverse cross-sectional area of the main passage;
   a bypass catalyst disposed in the bypass passage;

a passage open/close unit disposed in a portion of the main passage bypassed by the bypass passage and configured and arranged to switch between an open state and a closed state to selectively open or selectively close the main passage;

a residual gas amount changing unit configured and arranged to change an amount of residual gas remaining inside the combustion chamber; and a controller configured to control the residual gas amount changing unit when a passage opening condition for switching the passage open/close unit from the closed state to the open state is satisfied, the controller being configured to control the residual gas amount changing unit to maintain a substantially constant amount of the residual gas between before and after the passage open/close unit is switched from the closed state to the open state, with the residual gas amount changing unit including an intake valve open timing changing mechanism configured and arranged to change an open timing of the intake valve, and the controller being configured to control the intake valve open timing changing mechanism to advance the intake valve open timing when the passage open/close unit is switched from the closed state to the open state.

4. The internal combustion engine as recited in claim 3, wherein the intake valve open timing changing mechanism includes an intake valve phase changing device configured and arranged to advance a phase of a lift center angle of the intake valve to advance the intake valve open timing.

5. The internal combustion engine as recited in claim 2, wherein the controller is configured to increase an operating duty of the exhaust valve phase changing device upon the passage opening condition being satisfied prior to switching of the passage open/close unit from the closed state to the open state.

6. The internal combustion engine as recited in claim 4, wherein the controller is configured to increase an operating duty of the intake valve phase changing device upon the passage opening condition being satisfied prior to switching of the passage open/close unit from the closed state to the open state.

7. The internal combustion engine as recited in claim 1, further comprising the controller is further configured to control the exhaust valve close timing changing mechanism to return the exhaust valve close timing toward a retarded side in accordance with an operation of a throttle valve after the passage open/close unit is switched to the open state.

8. The internal combustion engine as recited in claim 3, wherein the controller is further configured to control the intake valve open timing changing mechanism to return the intake valve open timing toward a retarded side in accordance with an operation of a throttle valve after the passage open/close unit is switched to the open state.

9. An internal combustion engine comprising:

an intake valve configured and arranged to selectively open to introduce fresh air into a combustion chamber;

an exhaust valve configured and arranged to selectively open to release exhaust gas from the combustion chamber;

a main passage fluidly coupled to the combustion chamber to discharge the exhaust gas from the combustion chamber;

a main catalyst disposed in the main passage;

a bypass passage bypassing the main passage on an upstream side of the main catalyst, the bypass passage having a transverse cross-sectional area that is smaller than a transverse cross-sectional area of the main passage;

a bypass catalyst disposed in the bypass passage;

a passage open/close unit disposed in a portion of the main passage bypassed by the bypass passage and configured and arranged to switch between an open state and a closed state to selectively open or selectively close the main passage;

a residual gas amount changing unit configured and arranged to change an amount of residual gas remaining inside the combustion chamber; and a controller configured to control the residual gas amount changing unit when a passage opening condition for switching the passage open/close unit from the closed state to the open state is satisfied, the controller being configured to control the residual gas amount changing unit to reduce the amount of residual gas upon the passage opening condition being satisfied prior to switching of the passage open/close unit from the closed state to the open state, with the residual gas amount changing unit including a valve overlap changing mechanism configured and arranged to change a valve overlap amount between the exhaust valve and the intake valve, and the controller being configured to control the valve overlap changing mechanism to reduce the valve overlap amount prior to switching the passage open/close unit from the closed state to the open state.

10. The internal combustion engine as recited in claim 9, wherein the valve overlap changing mechanism includes an intake valve open timing changing mechanism configured and arranged to retard an intake valve open timing of the intake valve to reduce the valve overlap amount.

11. The internal combustion engine as recited in claim 9, wherein the valve overlap changing mechanism includes an exhaust valve close timing changing mechanism configured and arranged to advance an exhaust valve close timing of the exhaust valve to reduce the valve overlap amount.

12. The internal combustion engine as recited in claim 11, wherein the controller is further configured to control the exhaust valve close timing changing mechanism to set the exhaust valve close timing to equal to or more advanced than the intake valve open timing.

13. The internal combustion engine as recited in claim 9, wherein the controller is further configured to gradually reduce a valve open angle of a throttle valve while controlling the valve overlap changing mechanism to gradually reduce the valve overlap amount.

14. The internal combustion engine as recited in claim 9, wherein the residual gas amount changing unit further includes an external EGR device operatively coupled to the controller and configured and arranged to change an external EGR amount of a portion of the exhaust gas that is recirculated into an intake system, and the controller is configured to control the external EGR device to reduce the external EGR amount prior to switching the passage open/close unit from the closed state to the open state.

15. The internal combustion engine as recited in claim 14, wherein the controller is further configured to gradually reduce a valve open angle of a throttle valve while controlling the valve overlap changing mechanism and the external EGR device to gradually reduce the valve overlap amount and the external EGR amount, respectively.

16. The internal combustion engine as recited in claim 13, wherein the controller is further configured to control the valve overlap changing mechanism to gradually increase the valve overlap amount while gradually increasing a valve open angle of a throttle valve after the passage open/close unit is switched to the open state.

17. The internal combustion engine as recited in claim 15, wherein the controller is further configured to control the valve overlap changing mechanism and the external EGR device to gradually increase the valve overlap amount and the external EGR amount, respectively, while gradually increasing a valve open angle of a throttle valve after the passage open/close unit is switched to the open state.

* * * * *